Figure 1:
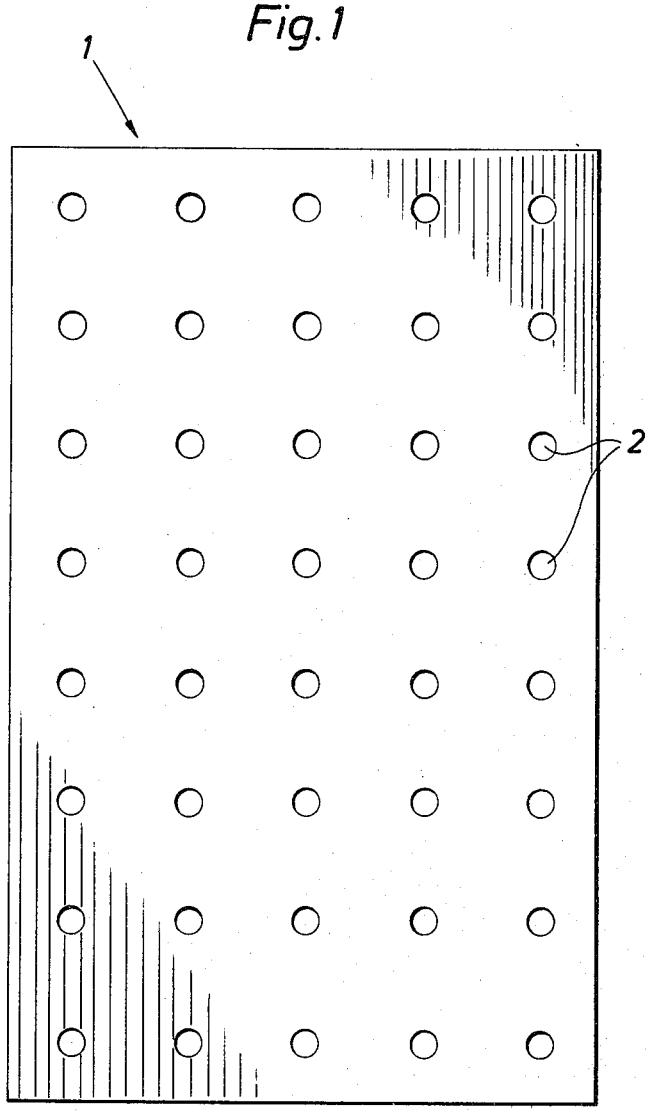

U.S. Patent  Feb. 23, 1982  Sheet 2 of 2  4,316,406

FLOW-DISTRIBUTING DEVICE AND AN AIR-INTAKE SCREEN PROVIDED WITH SUCH A DEVICE

The present invention relates generally to flow-distribution devices and also to screens provided with such devices, said screens being intended for for example working locations such that air can be introduced thereinto in a draught-free manner.

In German Open-to-public-print No. 2.754.699 there is described an air-intake device in the form of a compact screen through which large quantities of fresh air can be supplied to a working location without creating draughts.

The screens are arranged to be mounted on floors, adjacent to walls, or to be incorporated in ceiling structures. As a result of the particular design of the screen, the air is so evenly distributed that it is possible to stand close to the screen without experiencing a draught, despite the large quantities of air passing through the screen.

Because the air is passed to the room at a rate of flow which is suitably less than 0.3 m/sec., the flow of air will be laminar and have a low kinetic energy. Therefore, the air shall not have a temperature in excess of the temperature of the air in the location. Instead, the working location can be heated by means of, for example, air-heaters or radiators. Cool air can be introduced to overheated working locations through the screen without creating draughts.

Screens of an identical or similar design can be combined to form screen structures around different kinds of working locations. These working locations can also be separated acoustically by means of noise dampening components. The screened structures also eliminate undesirable air-flows, such as floor draughts.

With the use of simple connecting devices, the screens can be readily moved from one working location to another. Alternatively, attachment means can be used.

Screens of the aforedescribed type may also be used in, for example, spray boxes and sand-blasting booths, in the food industry and refrigeration chambers, or, for example, in large kitchens where said screens replace perforated ceilings. Other examples where such screens can be used include conference rooms, meeting halls, cinemas and theatres.

Such screens known hitherto incorporate an air-distributing device in the form of a perforated tube. There may be arranged in each of the perforations a respective nozzle which projects into the flow path of the air in a manner such as to divide said flow into a corresponding number of equally large uniformly divided part-flows which exit transversally of the direction of flow of the main air flow and leave the tube radially relative to its axis. The nozzles are suitably so designed that the rate of flow of said part-flows corresponds substantially to the rate of flow of the main flow upstream of the first nozzle.

A tubular air-intake device of the aforedescribed type can per se be used for different purposes, e.g. for creating hot air curtains and the like.

Swiss Pat. No. 584.872 and Danish Pat. No. 70.973 describe rather complicated flow-distribution devices having the purpose to create part-flows of varying magnitude.

One object of the present invention is to provide a simpler flow-distribution device which may either be used separately for different purposes or which may be incorporated in a screen provided with a perforated side surface and intended for the aforedescribed purposes.

In its widest aspect a flow-distributing device according to the invention comprises a perforated plate which forms a defining wall of a passage or a chamber having at least one further defining wall, said chamber receiving a flow of fluid and exhibiting adjacent said perforations deflecting means which project uniformly into the path of said fluid flow in a manner such as to divide said flow into a plurality of equally large part-flows which depart through the perforations to the other side of the defining wall.

A flow-distributing device having the form of a perforated plate in accordance with the invention can be produced at a much lower cost than, for example, a tube, and enables a flow, for example, of air to be effectively divided and effectively deflected in given directions over a large area, which in many cases is a desideratum or a requirement. Thus, a distributing device according to the invention can be used in a refrigerating chamber for distributing cold air over food-stuff. In many cases a uniform and relatively high flow rate is required, this being achieved by suitably forming the holes and the deflecting means.

Preferably, the deflecting means project a distance from the surface of the plate substantially corresponding to the diameter of the perforations.

In practice, the diameter of the perforations may vary between 4 and 40 mm in dependence upon the actual purpose of the flow distribution device. The distance between the perforations may vary between 20 and 100 mm. Thus, in a supply screen for fresh air to a working place the diameter may typically be 5-10 mm and the distance between the perforations typically 20-40 mm whereas a flow distribution device for a furnace, a fluidized bed or a cooling apparatus may comprise a perforated plate having a hole diameter of 25-35 mm and a distance between the holes of 70-100 mm.

The deflecting means may comprise nozzles which are inserted in holes punched in the plates and which have obliquely extending inlets.

Alternatively the deflecting means may comprise lips pressed out from the plate when forming the holes therein. It will be understood that this latter type of deflecting means can be readily formed in the plate and that the cost of the distributing device as a whole will be low, since no material other than that from which the plate is made is required.

By providing the deflecting means with a substantially cup-shaped obliquely extending inlet, the same pressure is obtained in all the holes or openings when converting the dynamic pressure of the flow to a static pressure in the opening itself. A large number of identical part-flows depart through the openings in a direction at right angles to the direction of flow of the original flow.

In a preferred embodiment, the distributing device is incorporated in an air-intake device having the form of a substantially box-shaped screen having a perforated side surface and an air-supply means, the distributing device forming a partition wall in the screen at a distance from said perforated side surface, thereby to form a defining wall of a pressure chamber on the opposite side of the partition wall.

Figure 3:
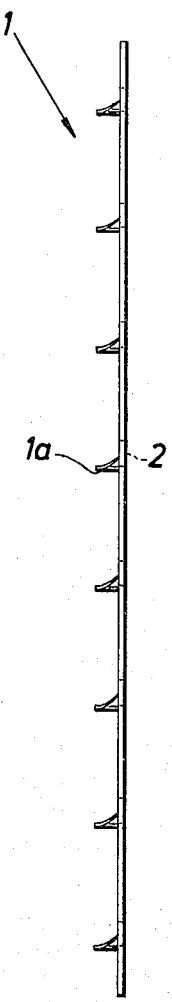
Figure 2:
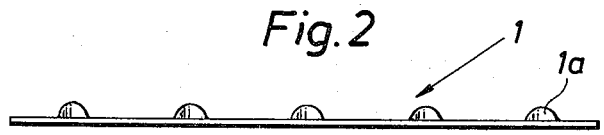
Figure 4:
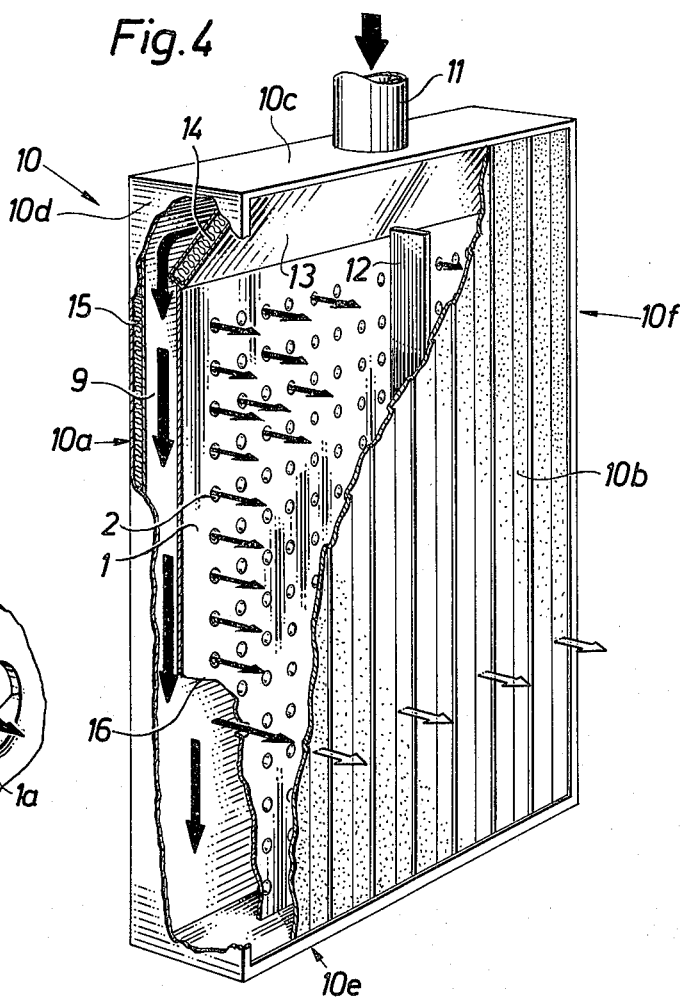

FIG. 4 illustrates an air-intake device in the form of a compact screen having a perforated side wall in which a distributing device constructed along the same principles as those illustrated in FIGS. 1–3 forms an intermediate wall which, together with the rear wall of the screen, defines a pressure chamber to which a flow of air is passed, said flow being divided into part-flows by the deflecting means of the intermediate wall, said part-flows departing to the space between the intermediate wall and the perforated front surface of the screen via the perforations.

The screen, which is generally designated 10 in FIG. 4, has a parallelepipedic shape with a rear side surface 10a and a front perforated side surface 10b. The end walls of the screen are referenced 10c, 10d, 10e and 10f. Fresh air is supplied to the screen through a supply pipe 11 which passes through the end wall 10c.

A distributing device in the form of a perforated plate 1 forms an intermediate wall in the screen. The intermediate wall defines, together with the rear side wall 10a, a pressure chamber 9 which accommodates the air flow entering the screen through the supply pipe 11. The intermediate wall 1 is joined to the region of the side edge between the front surface 10b and the other end wall 10c of the screen by means of an oblique surface 13. The purpose of this oblique surface is to distribute the air flow over the whole inner width of the screen and, at the same time, to dampen any sound, by reflecting sound waves down towards the interior of the screen. The oblique surface is suitably covered with a sound-absorbing material 14. The rear wall 10a may also suitably be coated with a sound-absorbing material 15, thereby to further improve the sound-damping effect.

The intermediate wall 1 joins the front wall 10b of the screen via a reinforcing strip 12 extending at right angles to the plane of the wall.

Figure 5:
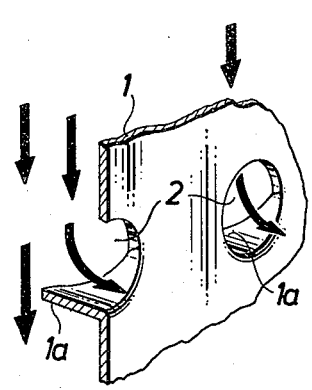

The vertical sectional view of a part of the intermediate wall illustrated in FIG. 5 shows how a lip- or cup-shaped deflecting means 1a deflects a part-flow from the main flow present in the pressure chamber, said part-flow departing through a corresponding hole 2 to the space between the intermediate wall 1 and the front perforated side surface 10b of the screen. The flow which finally departs through the perforations of the front wall will be extremely uniformly distributed over the whole side surface and has a very low velocity such that a totally draught-free air supply is obtained.

Figure 7:
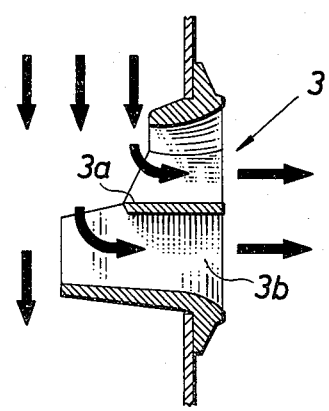
Figure 6:
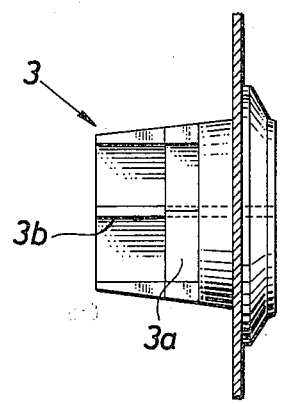

FIGS. 6 and 7 illustrate a nozzle which is arranged to be inserted in a respective perforation in the screen 1 and which replaces a lip 1a. The nozzle is referenced 3 in FIG. 6 and has an obliquely extending inlet 3a and an inner partition wall 3b, the axial lengths of which are shorter than the longest length of the nozzle, said partition wall dividing the nozzle into parts or chambers arranged to accommodate substantially equal part-flows. In the illustrated embodiment, the nozzle 3 has partition walls which form angles of about 120° with each other. The deflecting function of the nozzles is illustrated in FIG. 7.

An air-supply device of the kind illustrated in FIG. 4 has the following advantages:
1. Compact design
2. Flexibility
3. Uniform air distribution
4. Perpendicular outflow
5. Effective damping of fan noise
6. Low natural-sound generation
7. No clogging, or only slight clogging
8. Can be readily dismantled for cleaning purposes
9. Enables the flow of air to be readily measured, by measuring the pressure in the vicinity of the bottom part of the screen.

In practice the dimensions of the screen are suitably 1×2 m with a depth of 300 mm. It will be understood, however, that deviations from the standard measurements can be made in dependence upon prevailing circumstances. The screen may have different kinds of attachment means depending upon wheather the screen shall be placed on the floor or mounted on a wall or incorporated in a ceiling, or is to be joined together with other similar screens etc. To this end, the screen is thus suitably provided with replaceable attachment means.

A distributing device according to the invention can be used for distributing other gases than air, e.g. nitrogen gas for cooling purposes or for creating an inert atmosphere; oxygen gas for generating an oxydising atmosphere or the like.

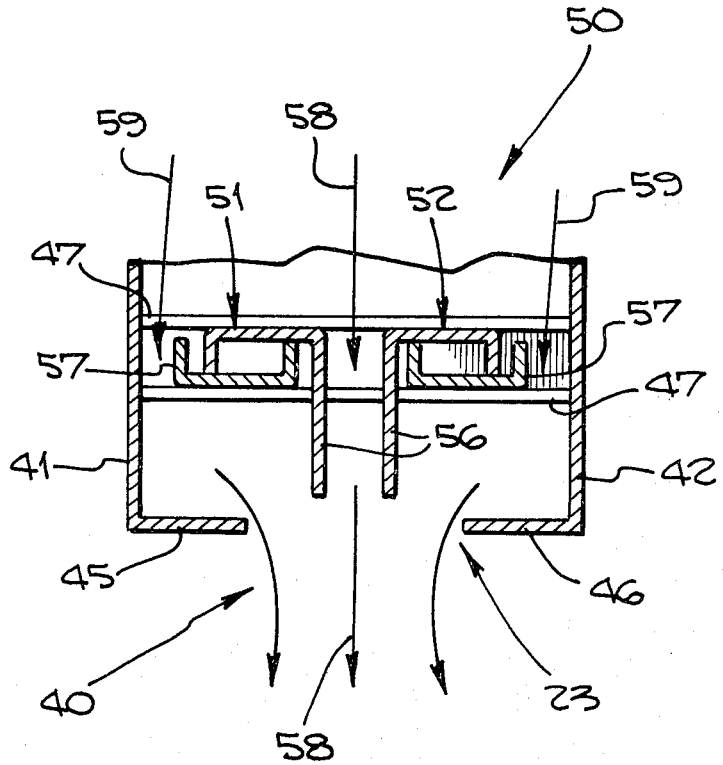

I claim:

1. An air supply device comprising a substantially parallelepipedic screen having a rear side surface and a front perforated side surface, means for supplying fresh air to the interior of said screen, and a flow-distributing device forming an intermediate, planar plate in the screen, said flow-distributing device being arranged such that the supplied fresh air flows parallel to one side of said planar plate of said device, the plate having substantially uniformly distributed perforations and carrying deflecting means projecting from the one side of the plate into the air flow for dividing the air flow into a plurality of parallel part-flows of equal magnitude passing through the plate, said intermediate plate, together with the rear side surface, forming a pressure chamber for accommodating the air flow supplied via the air-supply means, said parallel part-flows of supplied air passing to a space between the other side of said plate and the front perforated side surface of said screen and passing through said front perforated side surface, said flow-distributing device coacting with said front perforated side surface so that low velocity part-flows depart from the screen.

2. An air supply device according to claim 1, wherein the deflecting means project from one surface of the plate a distance substantially corresponding to the diameter of the perforations.

3. An air supply device according to claim 1, wherein the diameter of the perforations has a value between 4 and 40 mm and the distance between the perforations a value between 20 and 100 mm.

4. An air supply device according to claim 1, wherein the distance between the intermediate plate and the perforated side surface of the screen is at least equal to the distance between the perforations in the intermediate plate.

5. An air supply device according to claim 1, wherein said intermediate plate extends parallel with said side surface.

6. An air supply device according to claim 1, wherein said deflecting means comprises nozzles inserted into said perforations.

7. An air supply device according to claim 6, wherein said nozzles are divided by partition walls into chambers arranged to accommodate substantially equal part-flows.

8. An air supply device comprising a substantially parallelepipedic screen having a rear side surface and a front perforated side surface, a flow-distributing device having a planar plate extending parallel with said rear and front side surfaces and forming an intermediate wall in the screen, and means for supplying fresh air to the interior of said screen, said flow-distributing device being arranged such that the supplied fresh air flows parallel to one side of the planar plate of said device, the plate having substantially uniformly distributed perforations and carrying deflecting means projecting from the one side of the plate into the air flow for dividing the air flow into a plurality of parallel part-flows of equal magnitude passing through the plate, said planar plate, together with the interior of said rear side surface, forming a pressure chamber for accommodating the air flow supplied via the air-supply means, said parallel part-flows of supplied air passing to a space between the other side of said plate and the front perforated side surface of said screen and being uniformly distributed over the front perforated side surface, an oblique plate being positioned between an edge of said planar plate and air entering said pressure chamber for uniformly distributing air within said pressure chamber.

9. An air supply device according to claim 8, wherein the oblique plate has a covering of sound-insulating material.

* * * * *

United States Patent [19]

Lambert

[11] 4,316,407
[45] Feb. 23, 1982

[54] JET PAIR WEIR GATE

[75] Inventor: Robert R. Lambert, Glendora, Calif.

[73] Assignee: Air Factors West, Dublin, Calif.

[21] Appl. No.: 110,360

[22] Filed: Jan. 8, 1980

[51] Int. Cl.³ .............................................. F24F 13/06
[52] U.S. Cl. ................................... 98/40 D; 98/40 C; 98/40 N
[58] Field of Search .................. 98/38 C, 40 C, 40 D, 98/40 V, 40 VM, 40 N

[56] References Cited

U.S. PATENT DOCUMENTS

| | | | |
|---|---|---|---|
| 3,020,819 | 2/1962 | Kuhen | 98/38 B |
| 3,411,425 | 11/1968 | Lambert | 98/40 D |
| 3,444,801 | 5/1969 | Lambert | 98/40 D |
| 3,577,904 | 5/1971 | Lambert | 98/40 D |
| 3,949,656 | 4/1976 | Löhmann | 98/40 VM |
| 4,014,381 | 3/1977 | Clark | 98/40 D |

FOREIGN PATENT DOCUMENTS 2207514  8/1973  Fed. Rep. of Germany ..... 98/40 D

Primary Examiner—Albert J. Makay
Assistant Examiner—Harold Joyce
Attorney, Agent, or Firm—Poms, Smith, Lande & Rose

[57] ABSTRACT

A jet pair weir gate is provided in an air diffuser outlet and includes two pairs of nested jet weir members, each member having a generally U-shaped channel configuration consisting of an imperforate web portion and two flange portions. Each pair of members in both laterally expansible and laterally moveable across the outlet width to cooperate with each other in providing selectable air flow patterns through the outlet. In a prefered embodiment, the medial flange of each pair of jet weir members is provided with an extended length serving as a control surface, each adjacent flanges together acting as an air nozzle to focus a jet flow of air therebetween.

1 Claim, 11 Drawing Figures